US006511626B1

(12) United States Patent
Hutcherson

(10) Patent No.: US 6,511,626 B1
(45) Date of Patent: Jan. 28, 2003

(54) DIE FOR MANUFACTURING SOAP BARS

(75) Inventor: Allan Bruce Hutcherson, Newport (AU)

(73) Assignee: Central West Packaging & Storage Pty. Ltd., New South Wales (AU)

( * ) Notice: Subject to any disclaimer, the term of this patent is extended or adjusted under 35 U.S.C. 154(b) by 0 days.

(21) Appl. No.: 09/171,541

(22) PCT Filed: Apr. 3, 1997

(86) PCT No.: PCT/AU97/00215

§ 371 (c)(1), (2), (4) Date: Mar. 2, 1999

(87) PCT Pub. No.: WO97/40130

PCT Pub. Date: Oct. 30, 1997

(30) Foreign Application Priority Data

Apr. 23, 1996 (AU) ............................................. PN9457

(51) Int. Cl.[7] ............................................. B29C 39/38

(52) U.S. Cl. ......................... 264/320; 264/28; 264/319; 264/330

(58) Field of Search ................................ 425/547, 552, 425/395, 384, 408, 407, 446, DIG. 46; 264/DIG. 69, 328.14, 328.16, 327, 28, 319, 320, 330; 249/79, 80

(56) References Cited

U.S. PATENT DOCUMENTS 3,946,981 A * 3/1976 Frank .......................... 249/79
4,201,742 A * 5/1980 Hendry ...................... 264/45.5
4,264,292 A * 4/1981 Pisoni ........................ 425/236
4,327,045 A * 4/1982 Nishikawa et al. ........... 264/51
4,472,131 A * 9/1984 Ryder ......................... 425/548
4,680,001 A * 7/1987 Waters ....................... 425/144
4,934,155 A * 6/1990 Lowes ......................... 62/197
5,085,056 A * 2/1992 Page ............................ 62/64
5,433,081 A * 7/1995 Major et al. .................... 62/85
5,458,191 A * 10/1995 Chiang et al. .............. 164/133
5,460,761 A * 10/1995 Larsson ....................... 264/39
5,468,438 A * 11/1995 Yada .......................... 264/139
5,516,470 A * 5/1996 Larsson ....................... 264/39
5,573,787 A * 11/1996 Lupke et al. ............... 425/233
5,811,171 A * 9/1998 Osborne et al. ............ 428/141
6,048,189 A * 4/2000 Kurihara et al. ............ 425/149

OTHER PUBLICATIONS

Don Green, editor, Perry's Chemical Engineers' Handbook, 1997, p. 2–20.*

* cited by examiner

*Primary Examiner*—Jan H. Silbaugh
*Assistant Examiner*—Emmanuel Luk
(74) *Attorney, Agent, or Firm*—Ladas & Parry

(57) ABSTRACT

A machine and a method to manufacture soap bars. The machine and method involve a die assembly (10) having a pair of die blocks (11, 12) which support co-operating dies (13, 14). Liquid nitrogen is delivered to the two dies (13, 14) via a throttling passage (18) to cool the soap material being formed.

6 Claims, 4 Drawing Sheets

DIE FOR MANUFACTURING SOAP BARS

TECHNICAL FIELD

The present invention relates to machines to manufacture soap bars.

BACKGROUND OF THE INVENTION

Soap bars are manufactured by introducing into a die a block of relatively soft material from which the soap bar is to be formed. Typically, dies are provided with cavities trough which cooling water passes to cool the dies.

A problem with the above mentioned machines is that the soap bars formed frequently stick to the soap die because the current method of cooling has insufficient capacity and flow rate, particularly with glycerine/translucent soap. Still further, the above mentioned machines are relatively slow due to insufficient cooing capacity.

OBJECT OF THE INVENTION

It is the object of the present invention to overcome or substantially ameliorate the above discussed disadvantages.

SUMMARY OF THE INVENTION

There is disclosed herein a method to manufacture soap bars, said method including the steps of:

providing a first die member;

providing a second die member which co-operates with the first die member to provide a die cavity;

locating the die members so that they are spaced by a gap;

delivering to said gap a block of material from which the soap bar is to be formed;

bringing the die members together so that said material is enclosed in the cavity formed by the die members;

circulating a cooling fluid through the die members to cool the material;

separating the die members to expose the formed soap bar; and ejecting the soap bar from between the die members; and wherein said cooling fluid passes from a liquid phase to a gaseous phase within the die members.

There is further disclosed herein a machine to manufacture soap bars, said machine including:

a first die member;

a second die member to co-operate with the first die member to provide a die cavity;

means supporting the die members for relative movement therebetween a first position providing the die cavity and a second position at which the die members are spaced to permit material to form a soap bar to be delivered to a position between the die members and permit removal of a formed bar of soap; and ducts within the die members through which a cooling fluid is to pass, said ducts including throttling means to cause expansion of the fluid within the die members, from a liquid phase to a gaseous phase.

Preferably, the above machine would have the ducts including passages extending to the exterior of the die members so that the cooling fluid vents to atmospheres surrounding the die members.

Preferably, the cooling fluid is nitrogen.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
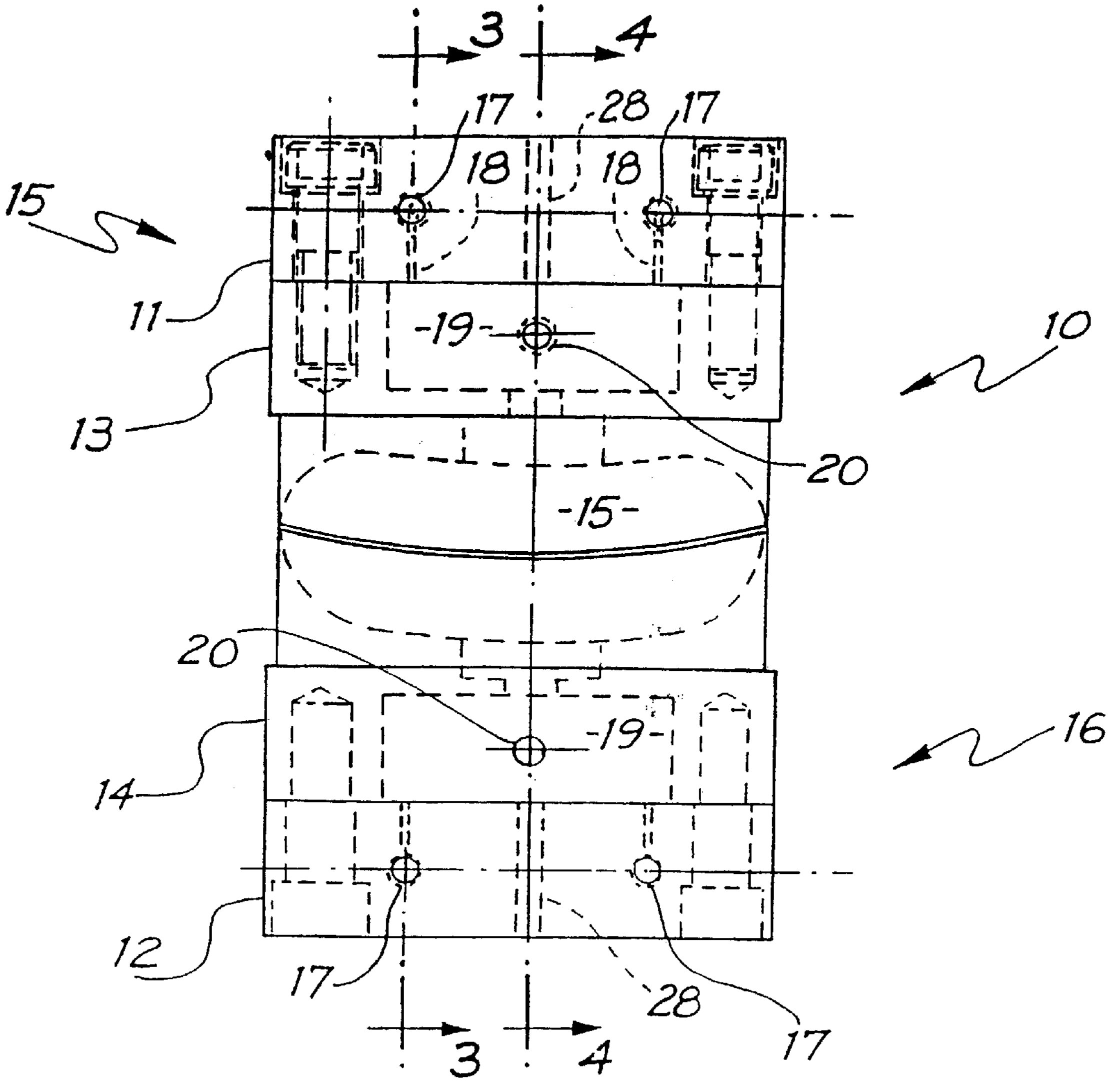
FIG. 1 is a schematic side elevation of a die assembly to manufacture soap bars.
Figure 2:
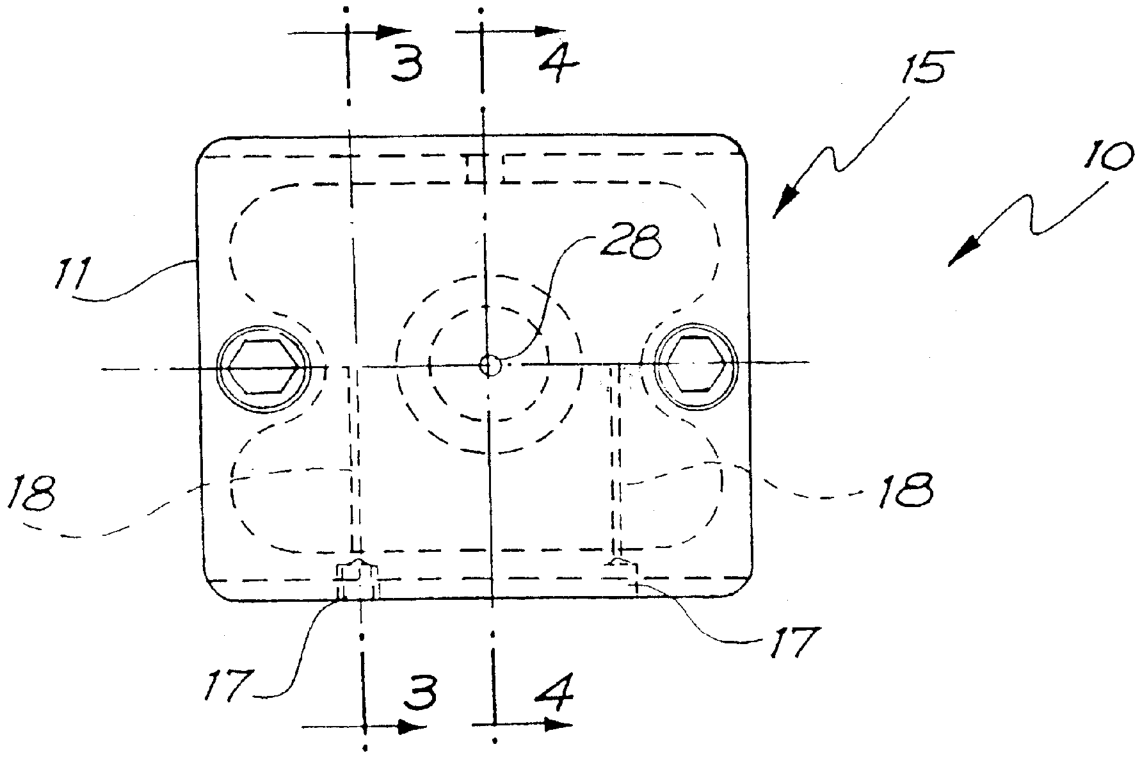
FIG. 2 is a schematic top plan view of the die assembly of FIG. 1.
Figure 3:
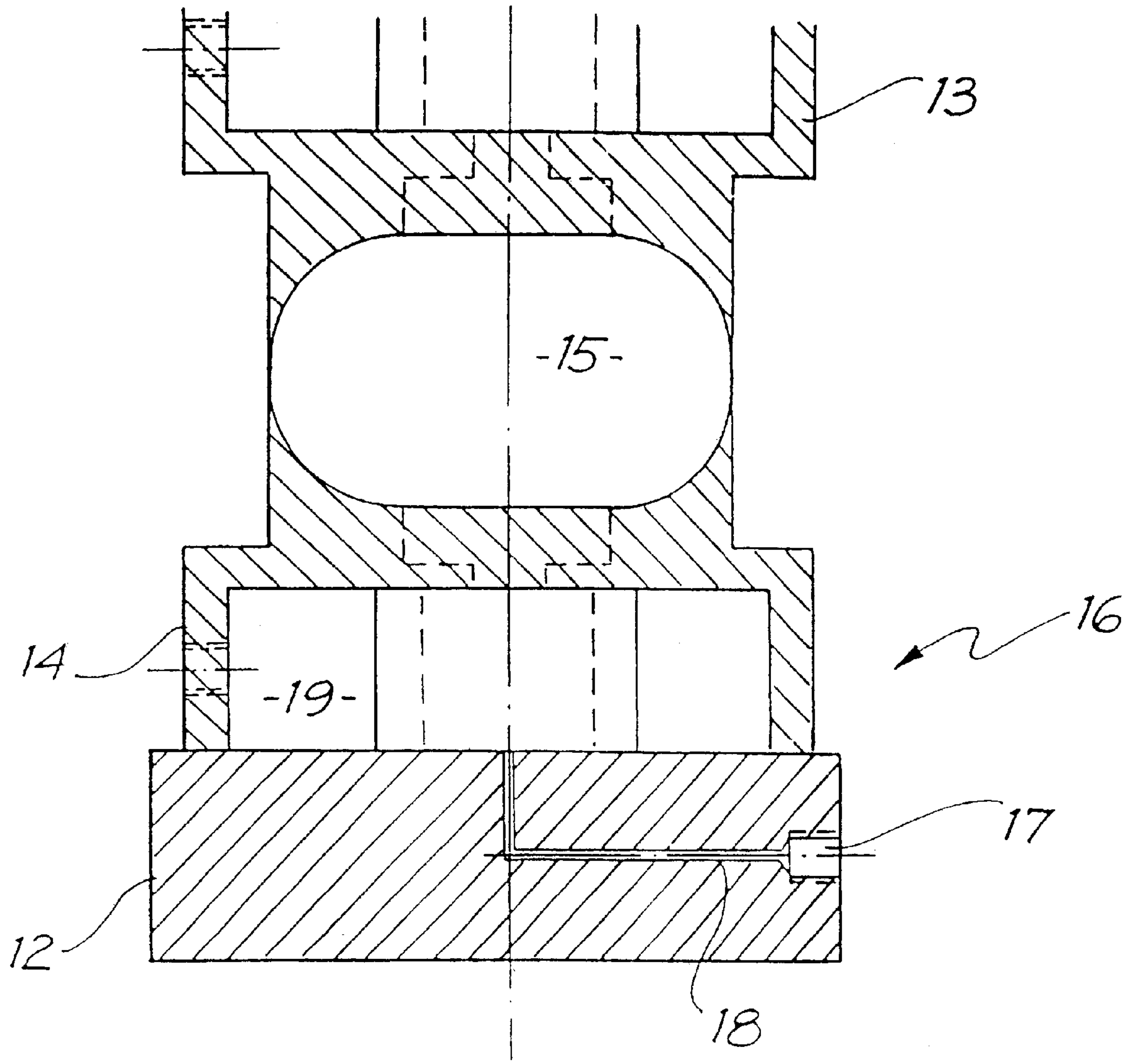
FIG. 3 is a schematic sectioned side elevation of the die assembly of FIGS. 1 and 2 sectioned along the line 3—3.

In the accompanying drawings there is schematically depicted a die assembly 10. The die assembly 10 includes die blocks 11 and 12 supporting co-operating dies 13 and 14. The dies 13 and 14 co-operate to provide a die cavity, 31 within which a soap bar is formed. The die block 11 and die 13 provide a first die member 15 while the die block 12 and die 14 provide a second die member 16. The die members 15 and 16 are mounted so that relative movement therebetween can take place, The die members 15 and 16 are moveable from the position depicted to a position in which they are spaced permitting a formed soap bar to be removed from the cavity 15 and new soap material to be delivered thereto to be formed into a soap bar.

The die assembly 10 includes ducts through which a cooling fluid passes to lower the temperature of the disassembly 10 to aid in forming the soap bar. The ducts includes inlet ports 17 to which a supply of liquid nitrogen is attached. The inlet ports 17 lead to narrow passages 18 which throttle the liquid nitrogen causing it to expand. The expansion of the cooling fluid from a liquid phase to a gaseous phase requires latent heat of vaporization. Accordingly, the temperature of the die members 15 and 16 is lowered. The passages 18 lead to a chamber 19 in each of the dies 13 and 14. The gas in the chambers 19 is allowed to exhaust via outlet passages 20. Accordingly, the cooling fluid in its gaseous phase is allowed to provide a surrounding environment in respect of the dies 13 and 14. This aids in reducing condensation and the formation of ice on the die members 15 and 16 and in particular the dies 13 and 14.

Figure 4:
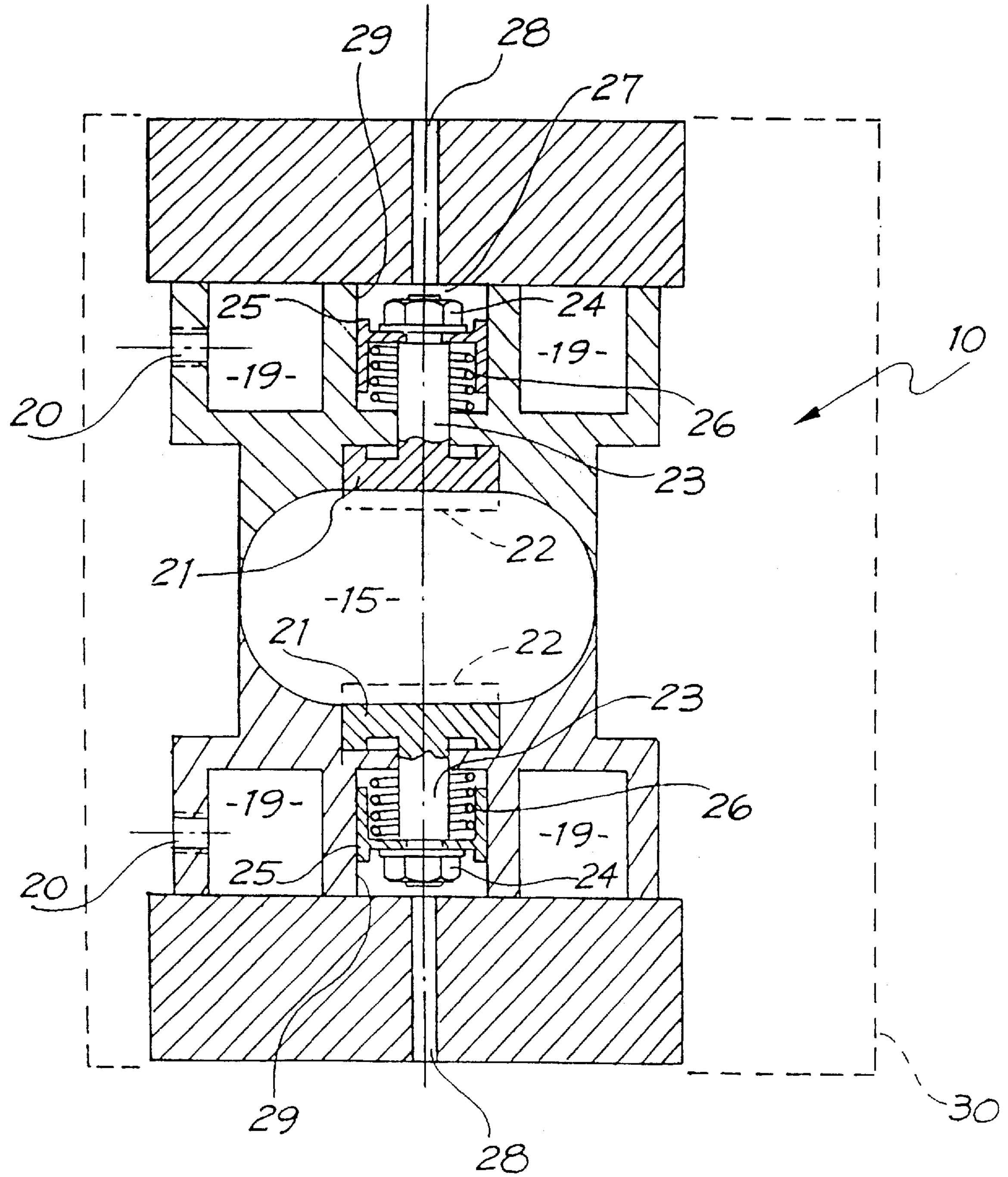
FIG. 4 is a schematic sectioned side elevation of the die assembly of FIGS. 1 and 2 sectioned along the line 4—4.

Preferably, each of the dies 13 and 14 is provided with an ejector 21 moveable from its retracted position illustrated in FIG. 4, to an extended position 22 at which it would aid in ejecting a formed soap bar from the die cavity 31. The ejector 21 includes a stem 23 having its extremity threaded and engaged with a nut 24. The nut 24 attaches a piston 25 to the stem 13, which piston 25 engages a spring which urges the piston 25 to move the ejector 21 to its retracted position.

The piston 25 co-operates with a cylindrical surface 29 to define a chamber 27. The chamber 27 has extending to it a passage 28. The passage 28 is attached to a supply of the cooling fluid (such as nitrogen). When cooling fluid of sufficient pressure is delivered to the chamber 27 the ejector 21 is moved to its extended position 22 to eject the formed soap bar. The cooling fluid delivered to the chamber 27 escapes through clearances between the piston 26 and surface 29, and the ejector 21 and associated die 13/14.

If so required, the die assembly 10 could be housed within an enclosure 30 to aid in retaining the gaseous cooling fluid around the die assembly 10. This would also aid in insulating the die assembly 10 to maintain its low temperature and exclude atmospheric moisture from the die assembly 10, thereby eliminating ice on the die blocks 11 and 12.

What is claimed is:

1. A method to manufacture a soap bar, said method comprising the step of:

providing a first die member;

providing a second die member which cooperates with the first die member to form a die cavity;

locating the die members so that they are spaced apart from each other;

positioning between the die members a block of material from which the soap bar is to be formed;

bringing the die members together so that said material is enclosed in the cavity formed by the die members;

circulating a cooling fluid through the die members to cool the material;

separating the die members to expose the formed soap bar;

ejecting the soap bar from between the die members; and delivering the cooling fluid in liquid form to the die members and then throttling the liquid so that the cooling fluid vaporizes within the die members.

2. The method of claim 1, wherein the cooling fluid is delivered to said first die member and flows therethrough and then through the second die member to exit from the second die member.

3. The method of claim 1, wherein the cooling fluid is nitrogen.

4. The method of claim 1, wherein the cooling fluid vents from the die members to atmosphere surrounding the die members.

5. A method for manufacturing a soap bar comprising the step of:

a) providing first and second die members with the first die member spaced apart from the second die member;

b) providing a block of soft material and positioning the block between the first and second die members;

c) forming the block into the soap bar by bringing the die members together so that the block is enclosed in a cavity formed by the die members and circulating a cooling fluid through the die members to cool the die members and the soft material, said soft material comprising a soap that sticks to the die members if the die members are not adequately cooled, said circulating comprising delivering a cooling liquid to the die members and then throttling the liquid so that the cooling liquid vaporizes within the die members and cools the die members sufficiently so as substantially to prevent the soft material from sticking to the die members;

d) separating the die members to expose the formed soap bar; and e) ejecting the soap bar from between the die members.

6. A method of claim 5, wherein the soft material comprises a glycerin soap.

* * * * *